H. MECKING.
ASH CART.
APPLICATION FILED JUNE 1, 1914.
1,139,307.
Patented May 11, 1915.
2 SHEETS—SHEET 2.
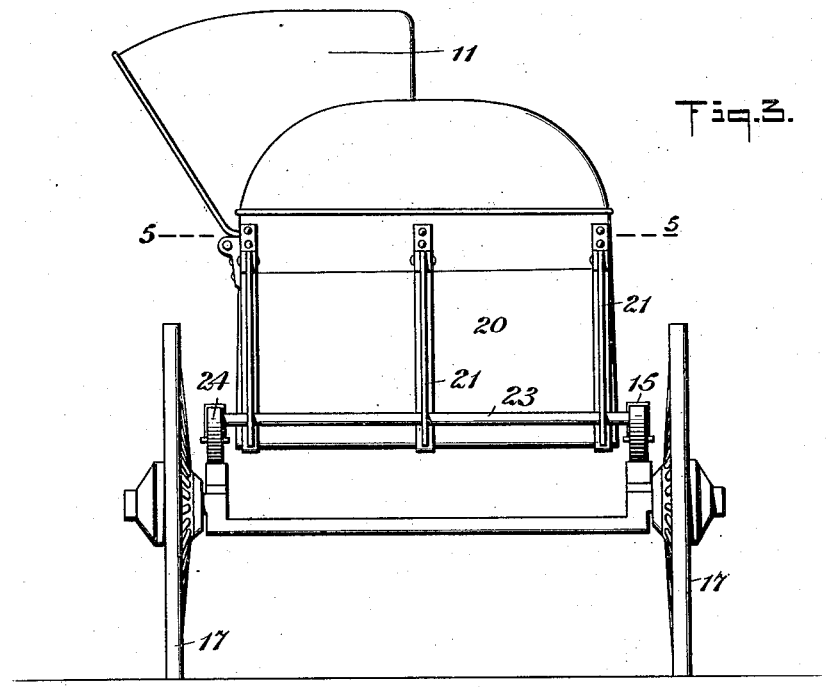
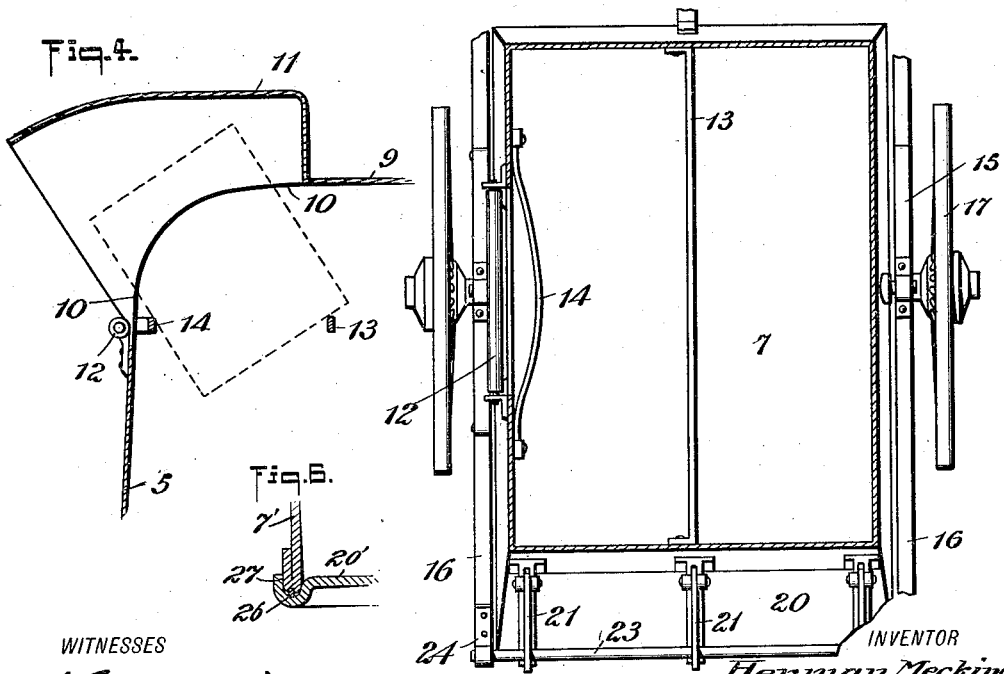
WITNESSES
INVENTOR
Herman Mecking
BY
ATTORNEYS

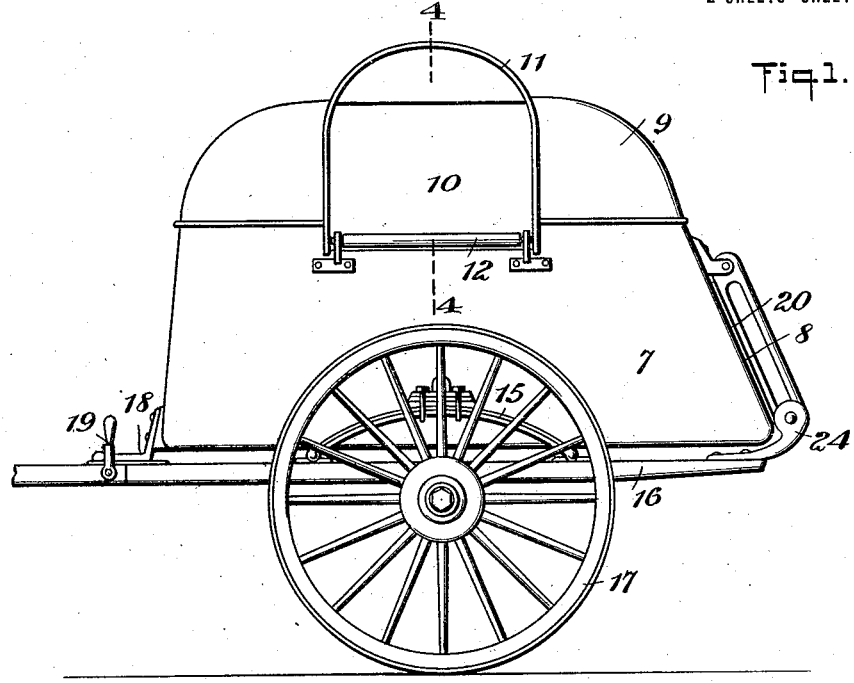
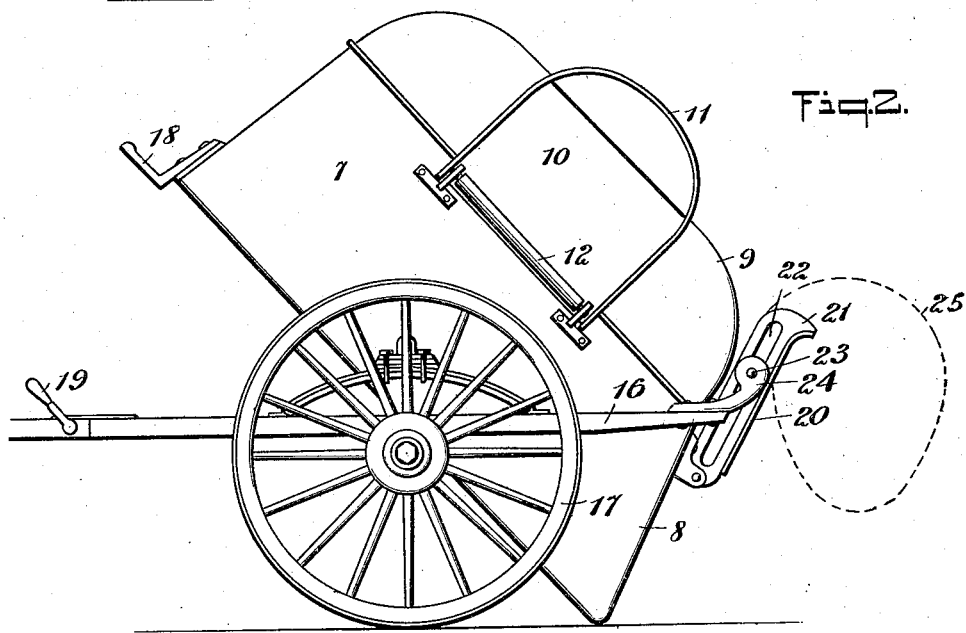

UNITED STATES PATENT OFFICE.

HERMAN MECKING, OF NEW YORK, N. Y.

ASH-CART.

1,139,307.  Specification of Letters Patent.  Patented May 11, 1915.

Application filed June 1, 1914. Serial No. 842,046.

*To all whom it may concern:*

Be it known that I, HERMAN MECKING, a subject of the Emperor of Germany, and a resident of the city of New York, borough of Bronx, in the county of Bronx and State of New York, have invented a new and Improved Ash-Cart, of which the following is a full, clear, and exact description.

My invention relates to ash carts, and has reference more particularly to a cart arranged with a closed top, which top is provided with an ash-barrel inlet supplied with a hood, and means at the inlet to facilitate the discharge of the ashes from the barrel and to prevent the falling of the barrel into the cart. The invention also pertains to ash carts having a pivotally mounted end automatically operated for discharging the ashes and which end is so positioned that it will not interfere nor retard the discharge of ashes from the cart.

An object of the invention is to provide a simple, strong and inexpensive ash cart which will prevent the scattering of ashes when the cart is propelled or when the ashes are discharged from the barrel into the cart.

Another object of the invention is to provide a substantially closed ash cart of large capacity into which ash barrels can be easily and quickly discharged with slight effort.

With the above and other objects in view, the nature of which will more fully appear as the description proceeds, the invention consists in the novel construction, combination and arrangement of parts as herein fully described, illustrated and claimed.

In the accompanying drawing forming part of the application, similar characters of reference indicate corresponding parts in all the views, and Figure 1 is a side elevation of an embodiment of my invention; Fig. 2 is a similar view showing the cart in the dumping position; Fig. 3 is an end view of a cart; Fig. 4 is a section on line 4—4, Fig. 1; Fig. 5 is a section on line 5—5, Fig. 3; and Fig. 6 is a modified structure of the discharge end of the body.

Referring to the drawings, 7 represents the body of the cart the rear end of which slopes downwardly, so that the length of the cart is greater near the bottom, the width of the cart being substantially uniform. The lower part of the rear end is cut out, as shown at 8, and forms the outlet end of the cart. The body 7 is provided with a bulging top 9 rigidly secured to the body and having at one side a cut-out 10 extending substantially to the middle of the top and midway between the ends of said top, said cut-out in the top 9 forming the ash-barrel inlet into the cart. Mounted over the cut-out and rigid with the top is a hood 11, in the shape of a buggy cover, large enough to admit the ash barrel. The open end of the hood 11 is made to overhang the side of the cart, as best seen in Figs. 3 and 4, so as to prevent the scattering of the ashes when the ash barrel is discharged into the cart. The cut-out 10 in the top is extended into the side of the body 7 whereat the body is provided with a roller 12 preferably mounted on the exterior side of the body. This roller will facilitate the movement of the ash barrel into the cart, as it will decrease the resistance of the shifting of the same therein.

To prevent the falling of the ash barrel into the ash cart and to facilitate the dumping of the same, the body 7 is provided with a longitudinal reinforcing member 13 positioned substantially in the middle of the cart adjacent the top 9. To facilitate the rolling of the ash barrel so as to better discharge the ashes, the body of the ash cart is provided with a member 14 positioned within the body opposite the roller 12. It will be noted that this member 14 is arcuated, causing a more even discharge of the ashes from the barrel into the cart. The member 14 also facilitates the separation of the ashes that may stick to the sides of the barrel, due to the rolling of the barrel on said member 14. The body 7 is provided with trunnions engaging resilient members 15 mounted on the chassis or frame 16, which is, in turn, mounted on wheels 17. The trunnions of the ash cart maintain the same in balance on the resilient members, but to prevent the accidental displacement of the ash cart the same is provided adjacent the bottom, at the front thereof, with a member 18 adapted to be engaged by a member 19 pivotally connected on the frame 16. The members 18 and 19 form locking means for locking the ash cart to the frame. Any other suitable means may be provided in place of the members 18 and 19 to obtain the same result.

The discharge end 8 of the cart is closed by a trap 20 hinged to the rear end adjacent the upper edge of the discharge opening by means of reinforcing members 21 carried on the outer side of said trap 20, said reinforcing members being provided with slots 22 engaged by a transverse member 23, which is preferably a roller, the bearings 24 of which are rigidly secured to the frame 16. The pivot and slots are so related with reference to the transverse member 23 that the lower end of the trap 20 will move in a path shown by the dotted line 25 when the cart is moved into the dumping position (see Fig. 2). It will be noted that this path of the trap is such that it will in no way interfere with the discharge of the ashes. It will also be noted that the movement of the trap is automatic; and the relation of the bearing for the transverse member 23 and for the pivot of the reinforcing members 21 is such that the trap 20 can be made to form a perfectly tight closure at the discharge end of the cart. It may be stated that the transverse member 23 forms a guide for the trap and never comes in alinement with the pivotal connection of the trap to prevent the movement of the same when the ash cart is moved on the resilient members, either from the dumping position to the position shown in Fig. 1 or vice versa.

In the modified structure shown in Fig. 6, the end and bottom of the body 7' at the discharge end are folded up and a suitable flexible member 26 is provided in the bend. The side and bottom edges of the trap 20' are rounded, as shown at 27, so as to engage the folded edges of the body with the flexible member 26 inclosed in the rounded portion, whereby a sealed joint is formed between the trap and the body at the discharge opening. This permits the transportation in the cart of semi-fluid substances.

From the above description it will be seen that by forming a closed ash cart having an ash-barrel inlet at one side thereof provided with a hood over it, which hood partly extends over the side of the cart, I prevent the scattering of ashes when the ash barrels are discharged into the cart and also when the cart is propelled. By the provision of the roller 12 and the arcuated member 14, I greatly facilitate the discharge of the ashes into the cart; and by the reinforcing members 13 the ash barrels are prevented from falling into the cart. All of these members, further, help to more evenly distribute the ashes in the cart. The provision of the dumping end, where the trap moves in such a path as to clear the space for the ashes to be dumped out permits the use of small wheels for the cart, and, therefore, brings the opening for the ash barrel closer to the ground, thereby facilitating the discharge of the same into the cart.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. In an ash cart, a frame, a body pivotally mounted on said frame; means normally locking the body and the frame, the rear end of said body sloping downwardly and having a discharge opening thereat; a trap for said opening connected to the body adjacent the upper edge of the discharge opening; a roller carried by the frame across said trap; and guiding means carried by the trap engaging said roller, the engagement of said guiding means and said roller causing the trap to move on its pivot when the body is moved in the frame.

2. In an ash cart, a frame; a body pivotally mounted on said frame; means normally locking the body on the frame, the rear end of said body sloping downwardly and having a discharge opening thereat; a trap for said openings having its side and bottom edges rounded and being adapted to fit snugly against the edges of the body at the discharge opening; means carried by the side and bottom edges of the discharge opening and adapted to be engaged by the trap whereby the discharge opening of the body is sealed; means connecting said trap and body adjacent the upper edge of the discharge opening; a roller carried by the frame across said trap; guiding means carried by the trap engaging said roller, the engagement of said guiding means and said roller causing the trap to move on its pivot when the body is moved by the frame.

3. In an ash cart, a frame; a body pivotally mounted on the frame, the rear end of said body sloping so that the capacity of the body at the bottom is greater than at the top, said rear end of the body having a discharge opening; a trap for said discharge opening pivotally connected to the body adjacent the upper edge of the discharge opening; and a roller carried by the frame extending across said trap, said trap having slotted guides engaging the roller, said roller adapted to move the trap on its pivot to a position substantially parallel to the rear of the body when the same is placed into dumping position.

4. In an ash cart, a frame; a body pivotally mounted on said frame, the rear end of said body sloping downwardly, whereby the capacity of the body increases toward the bottom, the rear of said body having a discharge opening; a trap for said opening having its sides and bottom edges rounded and adapted to fit snugly against the edges of the body at the discharge opening; means carried by the side and bottom edges of the discharge opening adapted to be engaged by the trap, whereby the discharge opening of the body is sealed; means pivotally connecting said trap to the body adjacent the upper edge of the discharge opening; a roller carried by the frame across said trap; and slotted guiding means carried by the trap and engaging with said slots said roller, the movement of the body on the frame causing the trap to move on its pivot, whereby said trap is adapted to be placed in a substantially parallel position to the back of the body when said body is placed into the dumping position.

In testimony whereof I have signed my name to this specification in the presence of two subscribing witnesses.

HERMAN MECKING.

Witnesses:
  GEORGE MECKING,
  BENEDICT JOFF.

Copies of this patent may be obtained for five cents each, by addressing the "Commissioner of Patents, Washington, D. C."